US008117061B2

(12) United States Patent
May et al.

(10) Patent No.: US 8,117,061 B2
(45) Date of Patent: Feb. 14, 2012

(54) SYSTEM AND METHOD OF USING DEMAND MODEL TO GENERATE FORECAST AND CONFIDENCE INTERVAL FOR CONTROL OF COMMERCE SYSTEM

(75) Inventors: Brent May, Scottsdale, AZ (US); William M. Chimitt, Jr., Scottsdale, AZ (US); Yetkin Ileri, Scottsdale, AZ (US); Jeffrey D. Moore, Phoenix, AZ (US); Adam Rosenberg, Scottsdale, AZ (US)

(73) Assignee: SAP AG, Walldorf (DE)

(*) Notice: Subject to any disclaimer, the term of this patent is extended or adjusted under 35 U.S.C. 154(b) by 470 days.

(21) Appl. No.: 12/496,884

(22) Filed: Jul. 2, 2009

(65) Prior Publication Data

US 2011/0004506 A1 Jan. 6, 2011

(51) Int. Cl.
*G06Q 30/00* (2006.01)
(52) U.S. Cl. .............. 705/7.31; 705/7.28; 705/7.29; 705/7.37; 705/7.25; 705/400
(58) Field of Classification Search .................. None
See application file for complete search history.

(56) References Cited

U.S. PATENT DOCUMENTS

| 7,089,250 | B2 * | 8/2006 | Doganata et al. ............. 1/1 |
| 7,370,001 | B2 * | 5/2008 | Harris ........................ 705/7.25 |
| 2001/0044788 | A1 * | 11/2001 | Demir et al. ................. 705/400 |
| 2002/0107026 | A1 * | 8/2002 | Agrawal et al. .............. 455/453 |
| 2003/0158772 | A1 * | 8/2003 | Harris ............................ 705/10 |
| 2005/0080806 | A1 * | 4/2005 | Doganata et al. ............. 707/102 |
| 2007/0156508 | A1 * | 7/2007 | Gilpin et al. .................... 705/10 |
| 2008/0037880 | A1 * | 2/2008 | Lai ................................ 382/232 |

OTHER PUBLICATIONS

Li Zhang, Peter B. Luh, and Krishnan Kasiviswanathan "Energy Clearing Price Prediction and Confidence Interval Estimation with Cascaded Neural Networks" IEEE Transactions on Power Systems, vol. 18, No. 1, Feb. 2003.*
Deng, Yan K. Cathey (2002). Monitoring process and assessing uncertainty for ANFIS time series forecasting. Ph.D. dissertation, West Virginia University, United States—West Virginia.*
Pan, Rong (2002). Statistical process adjustment methods for quality control in short-run manufacturing. Ph.D. dissertation, The Pennsylvania State University, United States—Pennsylvania.*

(Continued)

*Primary Examiner* — Lynda Jasmin
*Assistant Examiner* — Gurkanwaljit Singh
(74) *Attorney, Agent, or Firm* — Buckley, Maschoff & Talwalkar LLC

(57) ABSTRACT

A method for transforming transactional data into a forecast and confidence interval for controlling a commerce system involves moving goods between members of a commerce system, and recording transaction data related to movement of goods between the members of the commerce system. The transaction data includes price, product, time, and promotion. The model parameters are estimated based on the transactional data using a demand model to generate a forecast of demand for the goods based on a proposed price or promotion. A confidence interval of the certainty associated with the forecast of demand for the goods is determined based on the proposed price or promotion. The forecast of demand for the goods and confidence interval is provided to the commerce system to control the movement of goods based on the forecast of demand for the goods and confidence interval. The forecast and confidence interval can be graphically displayed.

21 Claims, 4 Drawing Sheets

OTHER PUBLICATIONS

Rajendra P. Srivastava, & Liping Liu. (2003). Applications of Belief Functions in Business Decisions: A Review. Information Systems Frontiers: Special Issue: Business Applications of Uncertain Reasoning, 5(4), 359-378.*

Walden, Mark. (1996). How to evaluate and improve a forecasting process. The Journal of Business Forecasting Methods & Systems, 15(2), 22.*

Jinhong Xie, X Michael Song, Marvin Sirbu, & Qiong Wang. (1997). Kalman Filter estimation of new product diffusion models. JMR, Journal of Marketing Research, 34(3), 378-393.*

Robert Fildes. (1983). An Evaluation of Bayesian Forecasting :Abstract. Journal of Forecasting (pre-1986), 2(2), 137.*

* cited by examiner

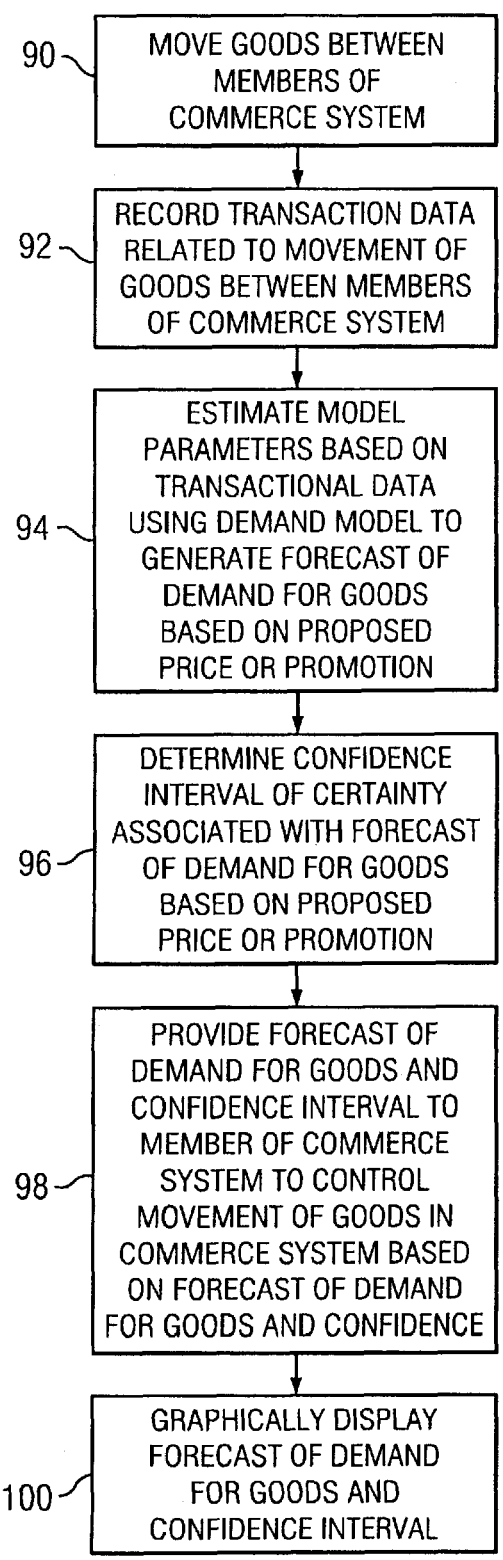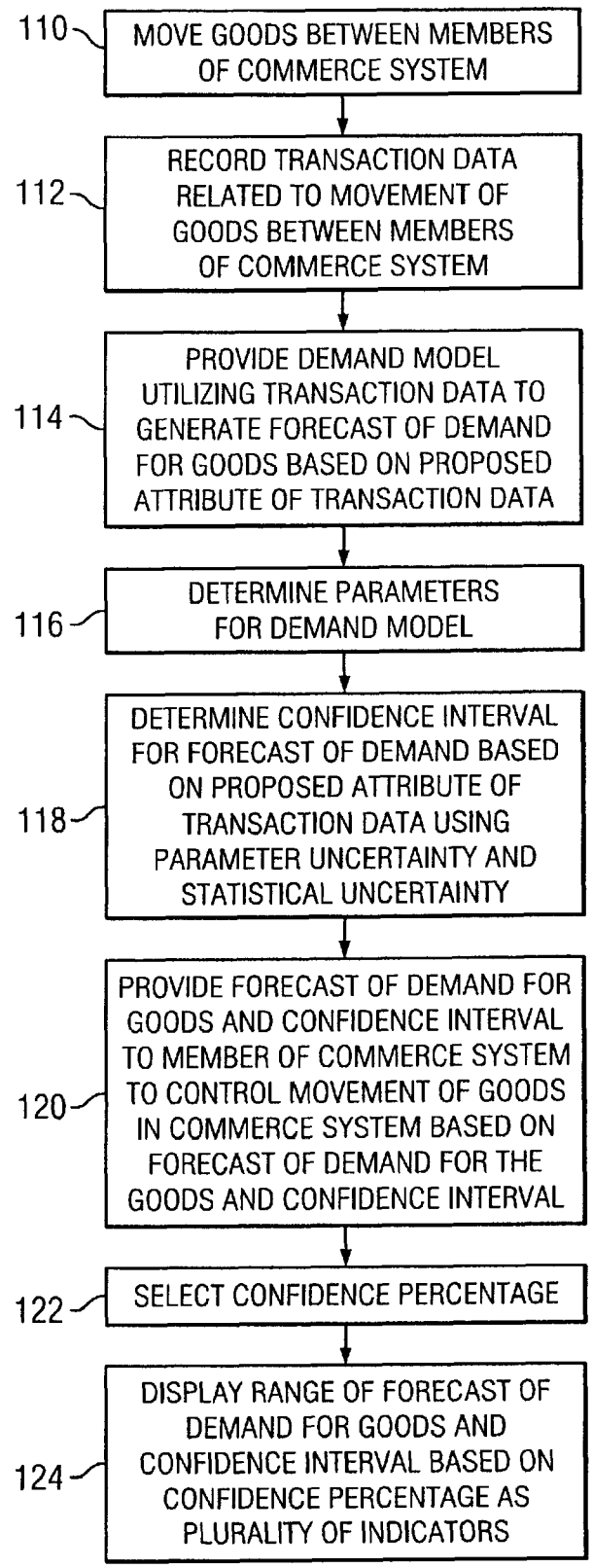
FIG. 5
FIG. 6

SYSTEM AND METHOD OF USING DEMAND MODEL TO GENERATE FORECAST AND CONFIDENCE INTERVAL FOR CONTROL OF COMMERCE SYSTEM

FIELD OF THE INVENTION

The present invention relates in general to economic modeling and, more particularly, to a system and method of using a forecast and confidence interval to control a commerce system.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task is to generate a mathematical model of the system which predicts how the system will behave with different sets of data and assumptions.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited customers and business. Most if not all retail stores expend great effort to maximize sales, volume, revenue, and/or profit. Economic modeling can be a very effective tool in helping store owners and managers achieve these goals.

Economic modeling typically requires large amounts of data. In the retail environment, the data is collected at the completion of the transaction, usually during the check-out process. The transactional log (T-LOG) data contains information and attributes about the items purchased, time and date of purchase, store, price, promotions, customer attributes, and so on. The T-LOG data is stored in a database for use by the retailer in generating and using the models.

Statistical models inherently have some degree of inaccuracy or uncertainty in several dimensions, such as price elasticity, promotional lift, and aggregations. The uncertainty directly relates to the level of user confidence in the reliability of the model. The forecast generated by the model changes with the historical data, which is statistically noisy or random and can vary by product, store, time period, and customer traffic. Attempting to model unknown areas, i.e., where there exists little or no historical data, increases the uncertainty of the forecast. For example, multiple and widely varied price points in the sales history provide better estimates of price elasticity than few and narrowly separated price points.

One method of estimating the confidence interval on a forecast for a particular price point where no historical data exists involves evaluating historical data for prices that do exist and then projecting that basis to the unknown pricing of interest, e.g., by linear interpolation. Alternatively, the forecast can use a simple empirical measure of forecast error. In such an approach, the distribution of the error in the model to historical sales is assumed to be uncorrelated with the time dependent application of causal factors. However, this approach does not account for future changes in key retail factors like price changes and promotional offers. Therefore, confidence bands could be too high or too low depending on the scenario as described by the offer price, promotional activity, advertising dollars spent, etc. Such estimates are notoriously inaccurate in their own right and do not yield the desired confidence or understanding of the true accuracy of the prediction. In order to understand and make full use of the forecast, the user needs a complete and accurate story of what the model is actually conveying.

SUMMARY OF THE INVENTION

A need exists to understand statistical uncertainty associated with demand model based forecasts. Accordingly, in one embodiment, the invention is a method for transforming transactional data into a forecast and confidence interval for controlling a commerce system comprising the steps of moving goods between members of a commerce system, and recording transaction data related to movement of goods between the members of the commerce system. The transaction data includes price, product, time, and promotion. The method further includes the steps of estimating model parameters based on the transactional data using a demand model to generate a forecast of demand for the goods based on a proposed price or promotion, determining a confidence interval of the certainty associated with the forecast of demand for the goods based on the proposed price or promotion, and providing the forecast of demand for the goods and confidence interval to a member of the commerce system to control the movement of goods in the commerce system based on the forecast of demand for the goods and confidence interval.

In another embodiment, the invention is a method for controlling commercial transactions using a forecast and confidence interval comprising the steps of moving goods between members of a commerce system, recording transaction data related to movement of goods between the members of the commerce system, providing a demand model utilizing the transaction data to generate a forecast of demand for the goods based on a proposed attribute of the transaction data, determining parameters for the demand model, determining a confidence interval for the forecast of demand based on the proposed attribute of the transaction data using parameter uncertainty and statistical uncertainty, and providing the forecast of demand for the goods and confidence interval to a member of the commerce system to control the movement of goods in the commerce system based on the forecast of demand for the goods and confidence interval.

In another embodiment, the invention is method for controlling commercial transactions using a forecast and confidence interval comprising the steps of moving goods between members of a commerce system, recording transaction data related to movement of goods between the members of the commerce system, providing a demand model utilizing the transaction data to generate a forecast of demand for the goods based on a proposed price or promotion, determining a confidence interval of the certainty associated with the forecast of demand for the goods based on the proposed price or promotion, and providing the forecast of demand for the goods and confidence interval to a member of the commerce system to control the movement of goods in the commerce system based on the forecast of demand for the goods and confidence interval.

In another embodiment, the invention is a system for controlling commercial transactions using a forecast and confidence interval comprising a commerce system having a plurality of members each having a control system for controlling movement of goods between the members. A database is in electronic communication with the commerce system for recording transaction data related to movement of goods between the members of the commerce system. A computer is in electronic communication with the commerce system for estimating model parameters based on the transactional data using a demand model to generate a forecast of demand for the goods based on a proposed price or promotion. The computer further provides a confidence interval of the certainty associated with the forecast of demand for the goods based on the proposed price or promotion. The forecast of demand for the goods and confidence interval is provided to a member of the commerce system to control the movement of goods in the commerce system based on the forecast of demand for the goods and confidence interval.

BRIEF DESCRIPTION OF THE DRAWINGS

FIG. 5 is a flowchart of a method for transforming transactional data into a forecast and confidence interval for controlling a commerce system;

FIG. 6 is a flowchart of a method for controlling commercial transactions using a forecast and confidence interval.

DETAILED DESCRIPTION OF THE DRAWINGS

Figure 1:
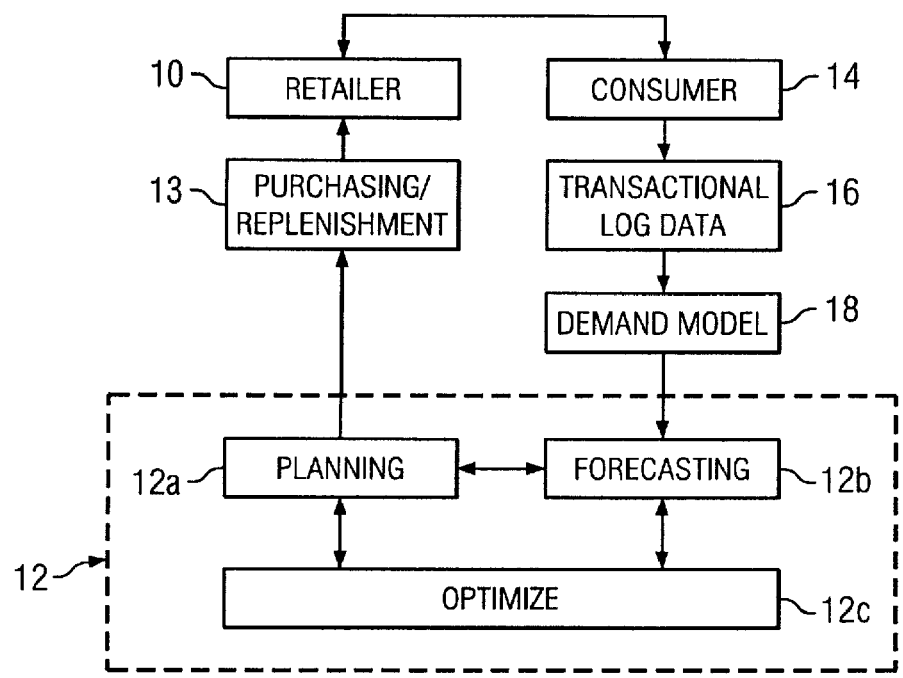
FIG. 1 is a block diagram of a system for analyzing transaction log data to generate a demand model and executing a business plan in accordance with the demand model.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses such as manufacturing, distribution, wholesale, retail, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general customer merchandise and other retail outlets. Many businesses are interested in economic modeling and forecasting, particularly when the model provides a high degree of accuracy or confidence. Such information is a powerful tool and highly valuable to the business.

Using the present system, a retailer collects T-LOG sales data for various products. Using the T-LOG data, the system generates a demand model for one or more products at one or more stores. The model is based upon the T-LOG data for that product and includes a plurality of parameters. The values of the parameters define the demand model and may be used for making predictions about the future sales activity for that product. For example, the model for each product can be used to predict future demand or sales of the product at that store in response to a proposed price, associated promotions or advertising, as well as impacts from holidays and local seasonal variations. Promotion and advertising increase customer awareness of the product.

An economic demand model analyzes historical retail T-LOG sales data to gain an understanding of retail demand as a function of retailer controlled factors such as price, promotion, seasonal trends, holidays, and other attributes of the transaction. The demand model can be used to forecast future demand by customers as measured by unit sales. Unit sales are typically inversely related to price, i.e., the lower the price, the higher the sales. The quality of the demand model—and therefore the forecast quality—is directly affected by the quantity, composition and accuracy of historical T-LOG sales data provided to the model.

The retailer makes business decisions based on forecasts. The retailer orders stock for replenishment purposes and select items for promotion or price discount. To support good decisions, it is important to quantify the quality of each forecast. The retailer can then review any actions to be taken based on the accuracy of the forecasts on a case-by-case basis.

Referring to FIG. 1, retailer 10 has certain product lines or services available to customers as part of its business plan 12. The terms products and services are interchangeable in the present application. Retailer 10 may be a food store chain, general customer product retailer, drug store, discount warehouse, department store, specialty store, or service provider. Retailer 10 has the ability to set pricing, order inventory, run promotions, arrange its product displays, collect and maintain historical sales data, and adjust its strategic business plan. While the present discussion will center around retailer 10, it is understood that the system described herein is applicable to data analysis for other members in the chain of retail commerce, or other industries and businesses having similar goals, constraints, and needs.

Business plan 12 includes many planning 12a, forecasting 12b, and optimization 12c steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make decisions to control its operations. With input from the planning 12a, forecasting 12b, and optimization 12c steps and operations of business plan 12, retailer 10 undertakes various purchasing or replenishment operations 13. Retailer 10 can change business plan 12 as needed.

Retailer 10 routinely enters into sales transactions with customers 14. In fact, retailer 10 maintains and updates its business plan 12 to increase the number of transactions (and thus revenue and/or profit) between retailer 10 and customer 14. Customer 14 can be a specific individual, account, or business entity.

For each sales transaction entered into between retailer 10 and customer 14, information describing the transaction is stored in T-LOG 16. When a customer goes through the cash register at a grocery or any other retail store, each of the items to be purchased is scanned and data is collected and stored by a point-of-sale system, or other suitable data storage system, in T-LOG 16. The data includes the then current price, promotion, and merchandising information associated with the product along with the units purchased, and the dollar sales. The date and time, and store and customer information corresponding to that purchase are also recorded.

T-LOG 16 contains one or more line items for each retail transaction, such as those shown in Table 1. Each line item includes information or attributes relating to the transaction such as store number, product number, time of transaction, transaction number, quantity, current price, profit, promotion number, and customer or customer category number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, sale price, coupon, rebate, end-cap, etc; customer identifies the customer by type, class, region, or individual, e.g., discount card holder, government sponsored or under-privileged, volume purchaser, corporate entity, preferred customer, or special member. T-LOG 16 is accurate, observable, and granular product information based on actual retail transactions within the store. T-LOG 16 represents the known and observable results from the customer buying decision or process. T-LOG 16 may contain thousands of transactions for retailer 10 per store per day, or millions of transactions per chain of stores per day.

TABLE 1

T-LOG Data

| Store | Product | Time | Trans | Qty | Price | Profit | Promotion | Customer |
|---|---|---|---|---|---|---|---|---|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 had transaction T1 in which customer C1 purchased one product P1 at $1.50. The next two line items also refer to transaction T1 and day/time D1, in which customer C1 also purchased two products P2 at $0.80 each and three products P3 at price $3.00 each. In transaction T2 on day/time D1, customer C2 has four products P4 at price $1.80 each and one product P5 at price $2.25. In transaction T3 on day/time D1, customer C3 has ten products P6 at $2.65 each, in his or her basket. In transaction T1 on day/time D2 (different day and time) in store S1, customer C4 purchased five products P1 at price $1.50 each. In store S2, transaction T1 with customer C5 on day/time D3 (different day and time) involved one product P7 at price $5.00. In store S2, transaction T2 with customer C6 on day/time D3 involved two products P1 at price $1.50 each and one product P8 at price $3.30.

Table 1 further shows that product P1 in transaction T1 had promotion PROMO1. PROMO1 may be any suitable product promotion such as a front-page featured item in a local advertising flyer. Product P2 in transaction T1 had promotion PROMO2 as an end-cap display in store S1. Product P3 in transaction T1 had promotion PROMO3 as a reduced sale price. Product P4 in transaction T2 on day/time D1 had no promotional offering. Likewise, product P5 in transaction T2 had no promotional offering. Product P6 in transaction T3 on day/time D1 had promotion PROMO4 as a volume discount for 10 or more items. Product P7 in transaction T1 on day/time D3 had promotion PROMO5 as a $0.50 rebate. Product P8 in transaction T2 had no promotional offering. A promotion may also be classified as a combination of promotions, e.g., flyer with sale price or end-cap with rebate.

Retailer 10 may also provide additional information to T-LOG 16 such as promotional calendar and events, holidays, seasonality, store set-up, shelf location, end-cap displays, flyers, and advertisements. The information associated with a flyer distribution, e.g., publication medium, run dates, distribution, product location within flyer, and advertised prices, is stored within T-LOG 16.

With T-LOG 16 data collected, any suitable method or algorithm may be used to analyze the data and form demand model 18. Model 18 may use a combination of linear, non-linear, deterministic, stochastic, static, or dynamic equations or models for analyzing T-LOG 16 or aggregated T-LOG 16 data and making predictions about customer behavior to future transactions for a particular product at a particular store, or across entire product lines for all stores. Model 18 is defined by a plurality of parameters and may be used to generate unit sales forecasting, price optimization, promotion optimization, markdown/clearance optimization, assortment optimization, merchandize and assortment planning, seasonal and holiday variance, and replenishment optimization. Model 18 has a suitable output and reporting system that enables the output from model 18 to be retrieved and analyzed for updating business plan 12.

After collection and analysis of the T-LOG data, several demand models can be generated for one or more products sold by retailer 10 at one or more stores. The models are defined by several parameters that provide weighting for different elements of the models. For example, the parameters control how the model reflects changes in product advertising, pricing, promotional activities, or other aspects of the market environment for the product.

Figure 2:
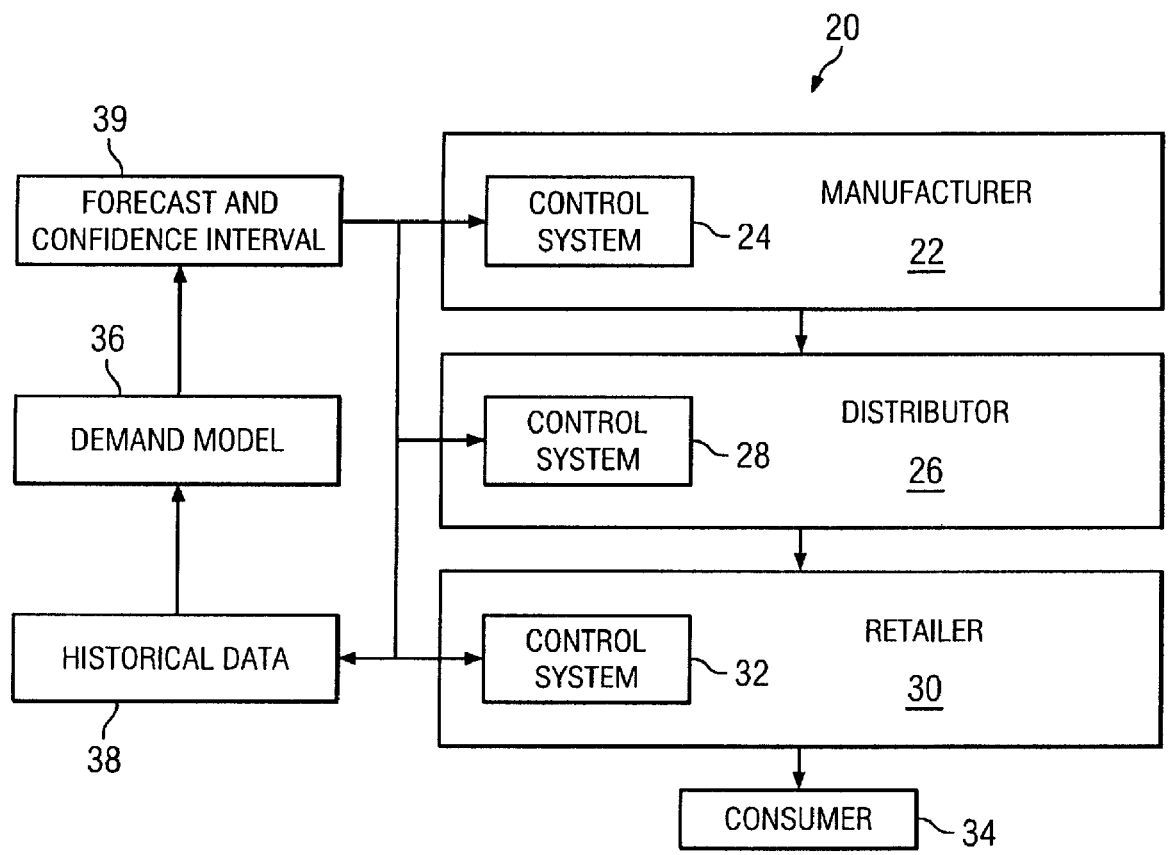
FIG. 2 is a block diagram of a commerce system controlled by members utilizing the forecast and confidence interval.

In FIG. 2, a commerce system 20 is shown involving the movement of goods between members of the system. Manufacturer 22 produces goods in commerce system 20. Manufacture 22 uses control system 24 to receive orders, control manufacturing and inventory, and schedule deliveries. Distributor 26 receives goods from manufacturer 22 for distribution within commerce system 20. Distributor 26 uses control system 28 to receive orders, control inventory, and schedule deliveries. Retailer 30 receives goods from distributor 26 for sale within commerce system 20. Retailer 30 uses control system 32 to place orders, control inventory, and schedule deliveries with distributor 26. Retailer 30 sells goods to customer 34.

Manufacturer 22, distributor 26, and retailer 30 utilize demand model 36, via respective control systems 24, 28, and 32, to control and optimize the ordering, manufacturing, distribution, sale of the goods, and otherwise execute respective business plan 12 within commerce system 20. Manufacturer 22, distributor 26, and retailer 30 provide historical transactional data 38 to demand model 36 by electronic communication link, which in turn generates forecasts to predict the need for goods by each member and control its operations. In one embodiment, each member provides its own historical transactional data 38 to demand model 36 to generate a forecast and confidence interval specific to its business plan 12 based on a proposed attribute of the transaction. Alternatively, all members can provide historical transactional data 38 to demand model 36 to generate composite forecasts and confidence intervals relevant to the overall flow of goods. For example, manufacturer 22 may consider a proposed price, rebate, promotion, seasonality, or other attribute for one or more goods that it produces. Demand model 36 generates the forecast and confidence interval of sales based on the proposed price, rebate, promotion, seasonality, or other attribute of the goods. The forecast and confidence interval is communicated to control system 24 by electronic communication link, which in turn controls the manufacturing process and delivery schedule of manufacturer 22 to send goods to distributor 26 based on the predicted demand. Likewise, distributor 26 or retailer 30 may consider a proposed price, rebate, promotion, or other attributes for one or more goods that it sells. Demand model 36 generates the forecast of sales and confidence interval based on the proposed price, rebate, promotion, seasonality, and/or other attribute of the goods. The forecast and confidence interval is communicated to control system 28 or control system 32 by electronic communication link, which in turn controls ordering, distribution, inventory, and delivery schedule for distributor 26 and retail 30 to meet the predicted demand for goods in accordance with the forecast.

Figure 3:
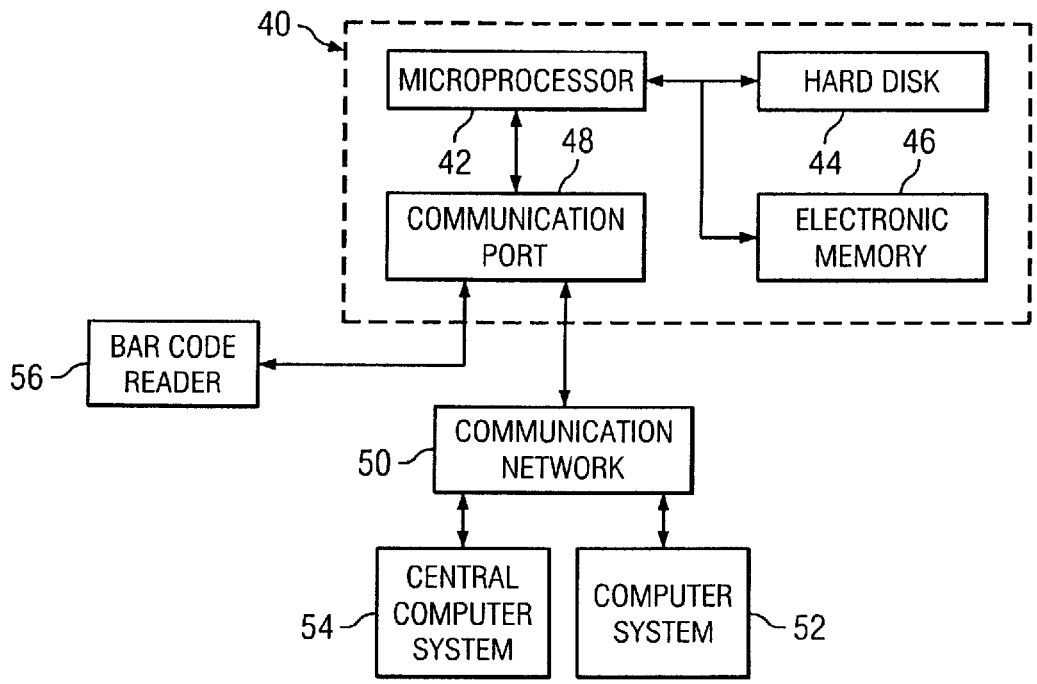
FIG. 3 is a computer system for executing the demand model and controlling the commerce system using the forecast and confidence interval.

A general purpose computer 40 is shown in FIG. 3. Computer 40 includes central processing unit or microprocessor 42, mass storage device or hard disk 44, electronic memory 46, and communication port 48. Communication port 48 is a high-speed communication link through communication network 50 to computer system 52 and central computer system 54, which includes a database storage system. In one embodiment, computer 40 provides execution for control system 32, computer system 52 provides execution for each of control systems 24 and 28, and central computer system 54 provides execution for demand model 36 from historical transactional data 38 as well as the execution of demand forecast and confidence interval 39. Demand model 36 and demand forecast and confidence interval 39 can also be executed on each of control systems 24, 28, and 32.

Computer 40 runs application software for executing software instructions that generate forecasts through demand model 36 and control commerce system 20. The software is originally provided on computer readable media, such as compact disks (CDs), or downloaded from a vendor website, and installed on the desired computer.

In the case of retailer 30, each product includes a universal product code (UPC) or barcode label. The barcode is encoded with a unique identification number for the product. The product is scanned over barcode reader 56 at the store checkout counter to read the UPC identification number. Barcode reader 56 is connected to communication port 48 to transfer the UPC data to computer 40. Computer 40 may be part of a computer network which connects multiple barcode readers in many stores to a central computer system which stores historical transactional data 38 in the database storage system.

From the UPC data, a product database on hard disk 44 retrieves the price for the product and any promotional initiatives. As each product from the customer's basket is scanned, computer 40 builds up a transaction in temporary file space on hard disk 44. Once the transaction is complete and customer 34 has paid, the transaction becomes a permanent T-LOG record in historical transactional data 38 in central computer system 54. The historical T-LOG data is used to generate a demand model 36 which in turn is used to generate forecast and confidence interval 39. The forecast and confidence interval 39 is used by respective control systems in manufacturer 22, distributor 26, and retailer 30 to control commerce system 20.

In one specific example, retailer 30 generates forecast and confidence interval 39 using demand model 36 based on historical transactional data 38, to predict demand associated with a proposed attribute of the transaction, e.g., a new and lower price for a particular product. Retailer 30 receives forecast and confidence interval 39 and executes or modifies its business plan 12 to act according to the prediction and the certainty in that prediction. If retailer 30 makes the business decision based on the forecast to proceed with the price reduction, control system 32 communicates with control systems 24 and 28 to coordinate manufacture and distribution of the product necessary to meet the projected demand by customer 34 in view of the price decrease. Manufacturer 22 increases its production of the product and distributor prepares to meet the orders from retailer 30. Demand model 36 is thus used in the control of commerce system 20.

Demand model 36 is used to generate a forecast based on historical transactional data and causal factors. The T_LOG data is transformed into a probability distribution of the forecast, with parameters of price, promotion, seasonality, and time. In general, the mean value of the probability distribution function is the forecast. The upper and lower bounds of the forecast, i.e. standard deviation, defines the confidence interval. The narrower the gap between the upper and lower bounds of the forecast, the smaller the confidence interval (greater confidence in the forecast). The wider the gap between the upper and lower bounds of the forecast, the larger the confidence interval (less confidence in the forecast).

In one embodiment, the forecast is determined by using a maximum likelihood estimate assuming a standard Poisson noise model. A covariance matrix is then determined which captures the variance of each model parameter, as well as the covariance between the model parameters. The covariance matrix is also used to determine the confidence interval around forecasts generated from the model. Subsequent paragraphs explain the model formation and then the estimation of the covariance matrix.

Assume the unit sales demand model has the form of equation (1). The demand utility function is defined in equation (2) as the scalar dot product of the variable control vector k and fixed model parameters θ.

$$U\tilde{S}=e^u \quad (1)$$

$$u=k\cdot\theta=k^T\theta \quad (2)$$

The term $U\tilde{S}$ represents modeled unit sales (demand) of a product as a function of u, the demand "utility" function. The goal in demand modeling is to solve for the fixed model parameters θ from N samples with varying values for k. With knowledge of θ, the unit sales can be forecast that would result from a given (potentially new) k. The row vector k represents known coefficients on the modeled parameter θ. For example, if $k=[1\ p]^T$ and $\theta=[q_0\ \beta]^T$, then equation (1) becomes $U\tilde{S}=e^{q_0+\beta p}$, where β describes how demand scales with price, and $q_0$ describes base demand. Determining the best value of the parameter θ provides a forecast of demand as a function of price p.

A Bayesian approach is used to estimate the best value for θ from the N trials with varying values for k. Bayesian estimation is an extension of the Maximum Likelihood Method (MLM) to include prior probability densities on the parameters. The approach is also known as Maximum A Posteriori (MAP) estimation because it maximizes the posterior density. The Bayesian approach finds the most probable set of parameters θ given a set of observations ($U\hat{S}$), as shown in equation (3).

$$\max_{\forall \theta} P(\theta | U\hat{S}) \tag{3}$$

The term $U\hat{S}$ represents the set of all available observations of unit sales. Using Bayes theorem, the maximization problem of equation (3) can be rephrased in terms of the a posteriori distribution, as given in equation (4).

$$\max_{\forall \theta}(\theta | U\hat{S}) = \max_{\forall \theta} \frac{P(U\hat{S}|\theta)P(\theta)}{P(U\hat{S})} \tag{4}$$

The observation probability term becomes equation (5) by making explicit the individual observations. The overall probability of observing a set $U\hat{S}$ of observations is given by the product of the probabilities of the individual observations given the model.

$$P(U\hat{S}|\theta) = \prod_{\forall t} P(U\hat{S}(t)|\theta) \tag{5}$$

A Poisson assumption is used for the observation distribution probability to expand equation (5) to equation (6).

$$P(U\hat{S}|\theta) = \prod_{\forall t} \frac{e^{-U\tilde{S}(t)} U\tilde{S}(t)^{U\hat{S}(t)}}{U\hat{S}(t)!} \tag{6}$$

A normal distribution is assumed for the Gaussian priors. The probabilistic formulation for Gaussian priors is given in equation (7), with $\theta_i^{ref}$ as the reference prior value for the model parameter $\theta_i$.

$$P(\theta) = \prod_{\forall i} \frac{e^{\frac{-(\theta_i - \theta_i^{ref})^2}{2\sigma_i^2}}}{\sqrt{2\pi\sigma_i^2}} \tag{7}$$

Substituting equations (6) and (7) into equation (4) yields the likelihood function for modeling in equation (8).

$$\frac{P(U\hat{S}|\theta)P(\theta)}{P(U\hat{S})} = \frac{\left[\prod_{\forall t} \frac{e^{-U\tilde{S}(t)} U\tilde{S}(t)^{U\hat{S}(t)}}{U\hat{S}(t)!}\right]\left[\prod_{\forall i} \frac{e^{\frac{-(\theta_i - \theta_i^{ref})^2}{2\sigma_i^2}}}{\sqrt{2\pi\sigma_i^2}}\right]}{P(U\hat{S})} \tag{8}$$

Since the logarithm of the a posteriori distribution in equation (8) is differentiable and monotonic with respect to the parameter θ, the Log-Likelihood Function (LLF) defined in equation (9) can be used to maximize the a posteriori probability density.

$$\Lambda(\theta, U\hat{S}) = \ln\left[\frac{P(U\hat{S}|\theta)P(\theta)}{P(U\hat{S})}\right] \tag{9}$$

$$= \sum_{\forall t}\left[-U\tilde{S}(t) + U\hat{S}\ln[U\tilde{S}(t)] - \ln[U\hat{S}(t)!]\right] +$$

$$\sum_{i}\left[\frac{-1}{2\sigma_{\theta_i}^2}(\theta_i - \theta_i^{ref})^2 - \frac{1}{2}\ln[2\pi\sigma_i^2]\right] - \ln[P(U\hat{S})]$$

The parameter vector θ that maximizes the LLF is found by setting the gradient of the LLF to zero in equation (10) and solving for the parameter θ. Taking the second derivative leads to a negative definite matrix indicating that the solution to equation (10) is the global maximum of the LLF.

$$\nabla_\theta \Lambda = 0 \tag{10}$$

The gradient of the utility function with respect to the parameter vector θ is defined in equation (11).

$$\vec{k} = \nabla_\theta u = \begin{bmatrix} \frac{\partial u}{\partial \theta_1} \\ \frac{\partial u}{\partial \theta_2} \\ \vdots \\ \frac{\partial u}{\partial \theta_N} \end{bmatrix} \tag{11}$$

The vector k is both the gradient multiplier and control vector from equation (2). The components of the gradient of the likelihood function are given in equation (12) and in vector form in equation (13) with $1/\sigma_{\theta_i}^2$ as the weight of the reference value.

$$\frac{\partial \Lambda}{\partial \theta_i} = \sum_{\forall t}\left[k_i(t)\left(-U\tilde{S}(t) + U\hat{S}(t)\right)\right] - \frac{1}{\sigma_{\theta_i}^2}(\theta_i - \theta_i^{ref}) \tag{12}$$

$$\nabla_\theta \Lambda = \begin{bmatrix} \sum_{\forall t}\left[k_1(t)\left(-U\tilde{S}(t) + U\hat{S}(t)\right)\right] - \frac{1}{\sigma_{\theta_1}^2}(\theta_1 - \theta_1^{ref}) \\ \sum_{\forall t}\left[k_2(t)\left(-U\tilde{S}(t) + U\hat{S}(t)\right)\right] - \frac{1}{\sigma_{\theta_2}^2}(\theta_2 - \theta_2^{ref}) \\ \vdots \\ \sum_{\forall t}\left[k_N(t)\left(-U\tilde{S}(t) + U\hat{S}(t)\right)\right] - \frac{1}{\sigma_{\theta_N}^2}(\theta_N - \theta_N^{ref}) \end{bmatrix} \tag{13}$$

Since the model is nonlinear, there is no direct solution to minimize the gradient. Instead, the method of successive approximation using Newton's method or Newton-Raphson algorithm to minimize the gradient. Newton's method requires an expression for the Hessian matrix of second-order partial derivatives, as given in equation (14).

$$H_{i,j} = \frac{\partial^2 \Lambda}{\partial \theta_i \partial \theta_j} \quad (14)$$

The vector k is used in the expression of the components of the Hessian matrix to maximize the a posteriori density iteratively using Newton's method, as shown in equation (15).

$$H_{i,j} = \sum_{\forall t} \left[-k_i^2(t) U\tilde{S}(t)\right] - \frac{1}{\sigma_{\theta_i}^2}, \; i = j \quad (15)$$

$$H_{i,j} = \sum_{\forall t} \left[-k_i(t) k_j(t) U\tilde{S}(t)\right], \; i \neq j$$

Newton's method suppresses higher order terms to create a linear approximation of a function. In this case, the solution for vector θ needed to make the gradient equal to zero is expressed in equation (16) with the likelihood function lambda suppressed.

$$\nabla_\theta \Lambda = 0 \quad (16)$$

Using Newton's method, the gradient is expanded about its current point at iteration n (defined by $\theta^{(n)}$) using the Hessian matrix H and suppressing higher order terms, as seen in equation (17).

$$\nabla_\theta \Lambda \approx \nabla \Lambda(\theta^{(n)}) + H(\theta^{(n)})(\theta - \theta^{(n)}) \quad (17)$$

The update formula in equation (18) is obtained by solving equation (17) for model parameter θ. The starting point $\theta^{(1)}$ is $\theta_i^{ref}$ values.

$$\theta^{(n+1)} = \theta^{(n)} - [H(\theta^{(n)})]^{-1}[\nabla \Lambda(\theta^{(n)})], n=1,2, \quad (18)$$

With the solution of the model parameters θ, the forecasted unit sales of the product is thus determined under model 36 as a function of the demand utility function.

Model 36 can also provide an estimated noise distribution. The unit sales are assumed to have a Poisson distribution. However, in many cases retail data is "over-dispersed", i.e., the data has a variance greater than would be expected given Poisson assumption. Several factors can cause the estimate of the error to be "over-dispersed" compared to the Poisson assumption. For example, when customer behavior deviates from the model and noise assumptions, when retailers do not execute planned promotions consistently, or when demand is adversely affected by stock outs, in addition to other unpredictable variations.

After estimating the demand model parameters, the "modeled unit sales" can be determined. Next, the difference between the modeled unit sales and the actual sales is calculated, also known as "the residual." Given an unbiased estimate, the distribution of the residual should have a zero mean. Assuming Poisson unit sales, the residual should have a variance equal to the modeled unit sales. If the variance is greater than the modeled unit sales, then the noise is larger than expected or over-dispersed. The expected statistical variance on a forecast is described by equation (19).

$$(\sigma^{stat}(t))^2 = \alpha \cdot U\tilde{S}(t) \text{ where}$$

$$\alpha = \frac{\sum_{\forall t} \left(w(t) \cdot U\tilde{S}(t) \cdot (U\tilde{S}(t) - U\hat{S}(t))^2\right)}{\sum_{\forall t} \left(w(t) \cdot U\tilde{S}(t) \cdot U\tilde{S}(t)\right)} \quad (19)$$

The variable w(t) describes time weighting and assumes that recent data is more important than older data. A modified Hessian, with $\alpha \geq 1$, is shown in equation (20) and includes the overdispersion contribution to the uncertainty.

$$\tilde{H} = H \cdot \frac{1}{\alpha} \quad (20)$$

A forecast is the evaluation of the demand model for a set of proposed values for the set of causal factors considered in the model. Without knowledge of the confidence interval, the understanding of the forecast in dimensions and cross-dimensions of interest is severely limited. Retailer 30 may not be able to make effective business decisions based on the forecast alone. By determining the confidence interval, retailer 30 can predict not only forecasted sales based on price of interest, but also understand the uncertainty associated with the model prediction.

The forecast generated using model 36 is by definition a prediction or estimate of future events and, as such, has an associated confidence interval which is a certainty band specified with an upper and lower bound about the forecast. The confidence interval encapsulates statistical variation in the model parameters estimates as well as the irreducible stochastic variations inherent in the consumer behavior. The actual unit sales are expected to fall within the confidence interval with a certain probability. The generation of a confidence interval is parameterized with this probability. For example, the forecast of demand for a particular product may be 1000 units per day. An 80% confidence interval will have a lower bound (a value less than 1000) and an upper bound (a value greater than 1000). For a properly calculated 80% confidence interval, there will be an 80% probability that the actual sales corresponding to the event forecast will lay between the lower and upper bounds.

The confidence interval is determined using two components: "model component" and "statistical component." The model component encapsulates the uncertainty in the estimated model parameter values. The statistical component encapsulates the irreducible stochastic variation in shopper behavior. These components are combined to produce a confidence interval with bounds that achieve the user selected target confidence percentage.

Both the model and statistical components are derived from the modeling process that generates demand model 36. This information includes the over-dispersion parameter α from equation (19) and the Hessian matrix from equation (20). The model-based error reflects the information content in the historical transactional data. The model-based error is parameterized by the model parameters producing automatic expansion or reduction of model uncertainty based on the proposed model attribute, e.g., future prices or promotions. Therefore, the error is not constant, but varies as a function of the model attributes over time, such as price and promotional offers. With proper accounting of both correlated and uncorrelated errors, it is also possible to aggregate uncertainty appropriately across time ranges, sets of products, and/or sets of locations in order to evaluate the accuracy of combined forecasts. Retailer 30 can specify the target confidence percentage for the forecast. For example, the calculated bounds of the confidence band can be used in replenishment calculations to achieve a desired service level. The replenishment calculations based on a demand assumption matching the upper bound of an 80% confidence interval will meet a 90% service level.

The final model-based covariance is projected into forecast unit sales (at the planned price and promotion) to predict the model-based forecast error. Because the uncertainty band is asymmetric, a model driven forecast low error and model driven forecast high error are determined according to the target confidence percentage. The statistical variance is determined based on the forecast unit sales and the scaled Poisson noise. The statistical forecasting error is adjusted to match the target confidence percentage.

Determining a confidence interval on a forecast requires knowledge of the uncertainty in the estimation of the demand model parameters. The uncertainty associated with a particular forecast can be determined and conveyed to retailer 30. The uncertainties are recorded in the model parameter covariance matrix. The covariance matrix, description of the causal factors influencing the sales in the forecast period, and target confidence percentage are used to determine the confidence interval.

Both the model certainty and the causal factors input to the forecast are important to the determination of the confidence interval. Consider an example where a demand model is generated from the historical transactional data for a product which has always been offered at $1.00. In the case where the model has no information about price sensitivity, the forecast has a theoretically infinite uncertainty regarding the affect that a proposed price other than $1.00 will have on demand. If the model is used to forecast demand at $1.00, the confidence interval will be relatively small. If the model is used to forecast demand at $2.00, the confidence interval will be much larger due (theoretically infinite) due to the lack of relevant historical transactional data.

As explained below, the model behavior changes if given prior knowledge of the price sensitivity. In this case, if the model is used to forecast demand at $1.00, the confidence interval will be relatively small as before. If the model is used to forecast demand at $2.00, the confidence interval will still be comparatively larger than at $1.00, but not infinitely wide.

The generation of the confidence interval is now demonstrated with a simplified model explaining sales as a function of a single causal factor (price). However, a person skilled in the art could extend the procedure to include the effects of promotional lifts, seasonality, or other causal factors. From equation (1), $U\tilde{S}$ is now defined in terms of equations (21)-(23) as follows:

$$U\tilde{S}(t) = e^{q_0 + \beta p(t)} \quad (21)$$

$$k(t) = [1 \quad p(t)]^T \quad (22)$$

$$\theta = [q_0 \quad \beta]^T \quad (23)$$

$$\tilde{H} = \frac{1}{\alpha} \cdot \begin{bmatrix} \sum_{\forall t}[-e^{q_0+\beta p(t)}] - \frac{1}{\sigma_q^2} & \sum_{\forall t}-[p(t)e^{q_0+\beta p(t)}] \\ \sum_{\forall t}[-p(t)e^{q_0+\beta p(t)}] & \sum_{\forall t}[-p(t)^2 e^{q_0+\beta p(t)}] - \frac{1}{\sigma_\beta^2} \end{bmatrix} \quad (24)$$

The covariance matrix in equation (24) is estimated using $C \approx -\tilde{H}^{-1}$. A 68% confidence interval defines a one standard deviation or "one-sigma" region which is consistent with the interpretation of the covariance matrix. The modeling sigma $\sigma^{mod}(t)$ is defined in equation (25) as:

$$\sigma^{mod}(t) = \sqrt{k(t)^T C k(t)} \quad (25)$$

The expression $k(t)^T$ is the transpose of $k(t)$ and C is the covariance matrix. Therefore, the high and low bounds on a 68% confidence interval are given by the evaluation of the following equations:

$$U\tilde{S}_{high}^{mod}(t) = e^{q_0 + \beta p(t) + \sigma^{mod}(t)} = U\tilde{S}(t) \cdot e^{\sigma^{mod}(t)}$$

$$U\tilde{S}_{low}^{mod}(t) = e^{q_0 + \beta p(t) - \sigma^{mod}(t)} = U\tilde{S}(t) / e^{\sigma^{mod}(t)} \quad (26)$$

Alternatively, equations (27) and (28) can be used to determine an interval for some percentage other than 68%, where d is the desired percentage, and $f_d = \sqrt{2} \cdot \text{erf}^{-1}(d)$ is the multiplicative factor for the desired percentage. The function $\text{erf}^{-1}$ is the inverse error function. Since the uncertainty is applied as a multiplicative factor, the confidence bands will be asymmetric.

$$U\tilde{S}_{high,d}^{mod}(t) = U\tilde{S}(t) \cdot e^{f_d \cdot \sigma^{mod}(t)} \quad (27)$$

$$U\tilde{S}_{low,d}^{mod}(t) = U\tilde{S}(t) / e^{f_d \cdot \sigma^{mod}(t)} \quad (28)$$

The multiplicative factors in equations (27)-(28) can be equivalently represented as two additive terms capturing the high and low bounds of the confidence interval defined in equations (29)-(30), where $\Delta_{high,d}(t)$ is the additive term to use when determining the upper bound and $\Delta_{low,d}(t)$ is the additive term to use when determining the lower bound.

$$\Delta_{high,d}(t) = U\tilde{S}_{high,d}^{mod}(t) - U\tilde{S}(t) \quad (29)$$

$$\Delta_{low,d}(t) = U\tilde{S}(t) - U\tilde{S}_{low,d}^{mod}(t) \quad (30)$$

To determine the statistical component, the sigma for the statistical uncertainty is $\sigma^{stat}(t) = \sqrt{\alpha \cdot U\tilde{S}(t)}$, and the statistical component of the forecast uncertainty in additive form is given by $\Delta_{stat,d}(t) = f_d \cdot \sigma^{stat}(t)$. The statistical component affects total uncertainty symmetrically so a single version is sufficient.

Once the adjusted model and statistical components of the forecast error are determined, the total forecast error is the standard root-sum-of-square (RSS) combination of statistical and model components. The total low forecast error equals the RSS of the statistical forecast error and the model driven forecast low error. The total forecast high error equals the RSS of the statistical forecast error and the model driven forecast high error. Depending on the nature of aggregation, the model component and statistical component of forecast uncertainty are combined appropriately. When aggregating forecasts for a given product-location over time, the model components of the errors are correlated and are directly summed. The statistical components, however, are independent and are thus RSS combined. The combined model and combined statistical components are RSS combined.

The model component and statistical component can be combined to determine a confidence interval for any specified confidence percentage. Assuming no aggregation in the total confidence interval, the model and statistical components of the error are independent, i.e., they are combined as RRS. The total confidence interval is shown by the two equations (31)-(32).

$$U\tilde{S}_{high,d}(t) = U\tilde{S}(t) + \sqrt{\Delta_{high,d}^2(t) + \Delta_{stat,d}^2(t)} \quad (31)$$

$$U\tilde{S}_{low,d}(t) = U\tilde{S}(t) - \sqrt{\Delta_{low,d}^2(t) + \Delta_{stat,d}^2(t)} \quad (32)$$

To produce a confidence interval on an aggregated forecast, an aggregation forecast A for the total confidence interval is given as a set of products defined in equation (33), where $U\tilde{S}_i$ is the forecast for product i, and $\omega_i$ is the weight applied to the forecast, with $\omega_i=1$ for unit sales aggregations, and $\omega_i=p_i$ (price of product i) for revenue aggregations.

$$A = \sum_{\forall t} \omega_i \cdot U\tilde{S}_i \quad (33)$$

In order to aggregate the confidence intervals, correlation of uncertainties must be handled properly for both the model component and statistical component. The aggregate high and low model variance is given in equation (34), where $(\Delta_{high,d})_i$ and $(\Delta_{low,d})_i$ are the high and low model uncertainty respectively for each product i, and $\rho_{mod}$ is the measured or known model correlation coefficient for the set of products.

$$(\Delta_{high,d}^{tot})^2 = \quad (34)$$

$$\rho_{mod} \cdot \left(\sum_{\forall t} \omega_i \cdot (\Delta_{high,d})_i\right)^2 + (1 - \rho_{mod}) \cdot \sum_{\forall t} (\omega_i \cdot (\Delta_{high,d})_i)^2$$

$$(\Delta_{low,d}^{tot})^2 = \rho_{mod} \cdot \left(\sum_{\forall t} \omega_i \cdot (\Delta_{low,d})_i\right)^2 + (1 - \rho_{mod}) \cdot \sum_{\forall t} (\omega_i \cdot (\Delta_{low,d})_i)^2$$

Similarly, the aggregate statistical variance is given in equation (35), where $(\Delta_{stat,d})_i$ is the statistical uncertainty for product i and $\rho_{stat}$ is the measured or known statistical correlation coefficient for the set of products.

$$(\Delta_{stat,d}^{tot})^2 = \rho_{stat} \cdot \left(\sum_{\forall t} \omega_i \cdot (\Delta_{stat,d})_i\right)^2 + (1 - \rho_{stat}) \cdot \sum_{\forall t} (\omega_i \cdot (\Delta_{stat,d})_i)^2 \quad (35)$$

Similar to equation (34), the confidence interval for aggregate forecast A is given in equation (36) as:

$$A_{high,d} = A + \sqrt{\Delta_{high,d}^{tot^2} + \Delta_{stat,d}^{tot^2}},$$

$$A_{low,d} = A - \sqrt{\Delta_{low,d}^{tot^2} + \Delta_{stat,d}^{tot^2}} \quad (36)$$

The above method can be used to aggregate confidence intervals over different retail dimensions such as product, store, and time, or combinations thereof. Consider the following example of sales figures that resulted from a product offered over time at two different prices. In the forecast period, the product is offered at a previous price and new price. Since the history provides limited understanding of price elasticity, the confidence interval will be wider for the new price.

Table 2 provides numerical data from historical T-LOG data 16 and forecast from demand model 36 of the proposed price. Time period columns 1-10 describe historical data, and time period columns 11-12 describe the forecast period. Therefore over-dispersion, Hessian, and covariance matrix are determined using only data from time periods 1-10. Row 1 is the price in US dollars for a product location for each time period; row 2 is the unit sales for each time period; row 3 is the model fit assuming the Newton converged to $q_0=4$ and $\beta=-1$; row 4 is the forecast in time periods 11-12.

TABLE 2

Historical Data and Forecast from Demand Model

| Row | | 1 | 2 | 3 | 4 | 5 | 6 | 7 | 8 | 9 | 10 | 11 | 12 |
|---|---|---|---|---|---|---|---|---|---|---|---|---|---|
| | | | | | | Sales History | | | | | | | |
| 1 | Price | 2.00 | 2.00 | 2.00 | 2.00 | 2.00 | 1.75 | 1.75 | 1.75 | 1.75 | 1.75 | 1.75 | 1.50 |
| 2 | $U\tilde{S}$ | 3 | 9 | 11 | 4 | 6 | 14 | 8 | 7 | 13 | 11 | | |
| | | | | | | Demand Model | | | | | | | |
| 3 | $U\tilde{S}$ model | 7.39 | 7.39 | 7.39 | 7.39 | 7.39 | 9.49 | 9.49 | 9.49 | 9.49 | 9.49 | | |
| 4 | $U\tilde{S}$ forecast | | | | | | | | | | | 9.49 | 12.18 |

From Table 2 and equations (1)-(36), $$\alpha = 1.06$$

$$H = \begin{bmatrix} -79.4 & -147.6 \\ -147.6 & -275.7 \end{bmatrix}$$

$$C = \begin{bmatrix} 2.8 & -1.5 \\ -1.5 & 0.8 \end{bmatrix}$$

$$f_d = 1.13$$

$$d = 90\%$$

Given the values for $\alpha$, H, and C, other time dependent determinations from equations (1)-(36) can be made, as shown in Table 3. In row 1, $e^{f_d \cdot \sigma^{mod}}$ for a 90% confidence interval is determined from $f_d = \sqrt{2} \cdot \text{erf}^{-1}(d)$. In rows 2a-2b, the model component of error (low and high) as an additive term from equations (29)-(30). In row 3, the statistical component of the error for a 90% confidence interval is determined from $\Delta_{stat,d}(t) = f_d \cdot \sigma^{stat}(t)$. In rows 4-5, the lower and upper bounds of the confidence interval are determined from equations (31)-(32). The confidence interval is determined and placed about model fits as well as forecasts.

TABLE 3

Confidence Interval

| Row | | Time | | | | | |
|---|---|---|---|---|---|---|---|
| | | 1 | 2 | 3 | 4 | 5 | 6 |
| 1 | $e^{f_d \cdot \sigma^{mod}}$ | 1.21 | 1.21 | 1.21 | 1.21 | 1.21 | 1.18 |
| 2a | $\Delta_{low,d}$ | 1.28 | 1.28 | 1.28 | 1.28 | 1.28 | 1.48 |
| 2b | $\Delta_{high,d}$ | 1.56 | 1.56 | 1.56 | 1.56 | 1.56 | 1.75 |
| 3 | $\Delta_{stat,d}$ | 3.16 | 3.16 | 3.16 | 3.16 | 3.16 | 3.58 |
| 4 | $U\tilde{S}_{low,d}$ | 3.98 | 3.98 | 3.98 | 3.98 | 3.98 | 5.62 |
| 5 | $U\tilde{S}_{high,d}$ | 10.91 | 10.91 | 10.91 | 10.91 | 10.91 | 13.47 |

| Row | | Time | | | | | |
|---|---|---|---|---|---|---|---|
| | | 7 | 8 | 9 | 10 | 11 | 12 |
| 1 | $e^{f_d \cdot \sigma^{mod}}$ | 1.18 | 1.18 | 1.18 | 1.18 | 1.18 | 1.48 |
| 2a | $\Delta_{low,d}$ | 1.48 | 1.48 | 1.48 | 1.48 | 1.48 | 3.93 |
| 2b | $\Delta_{high,d}$ | 1.75 | 1.75 | 1.75 | 1.75 | 1.75 | 5.79 |
| 3 | $\Delta_{stat,d}$ | 3.58 | 3.58 | 3.58 | 3.58 | 3.58 | 4.06 |
| 4 | $U\tilde{S}_{low,d}$ | 5.62 | 5.62 | 5.62 | 5.62 | 5.62 | 6.53 |
| 5 | $U\tilde{S}_{high,d}$ | 13.47 | 13.47 | 13.47 | 13.47 | 13.47 | 19.25 |

Figure 4:
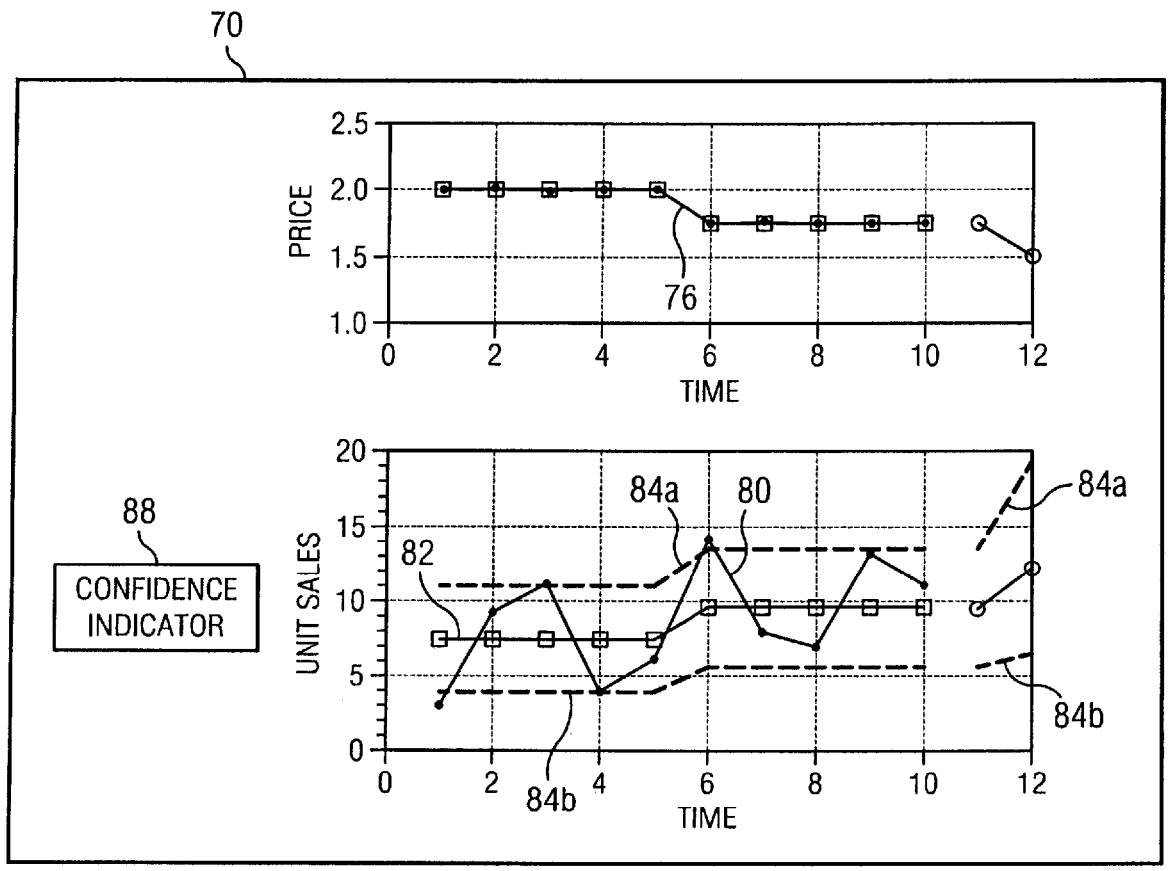
FIG. 4 is a graphical plot of the demand forecast and associated confidence interval.

The confidence interval can be graphically displayed, e.g., on computer terminal 70 in FIG. 4, for retailer 30. Display 70 shows price as a function of time in graphical plot 76 from the above example, including Tables 2 and 3. Notice the price decrease prior to time 6, indicating the proposed price. The closed circles in plot 76 represent historical T-LOG data from time periods 1-10. The open circles in plot 76 for time periods 11 and 12 represent the future period to be forecast. Display 70 also shows unit sales as a function of time in graphical plots 80 and 82. Plot 80 represents actual observations (UŜ) from historical T-LOG data. Plot 82 represents forecasted unit sales (UŠ) generated by model 18. Notice the projected increase in unit sales corresponding to the price decrease prior to time 6.

The dashed lines 84a and 84b indicate the upper and lower bounds of the confidence interval given in rows 4 and 5 of Table 2. The confidence interval for the forecast time period 11 is equal to the confidence interval on the model fits in time periods 6 through 10, due to the fact that the causal factors applied are identical. However, the forecast for time period 12 considers a new price higher than any seen in the sales history from which the demand model was formed. In this time period the confidence interval is wider. Plots 80 and 82, with confidence interval 84a-84b, provide the user with a quantified accuracy or uncertainty associated with the forecast. The user can evaluate the confidence interval and make decisions based on the certainty of the prediction for the operation of commerce system 20 as described in FIG. 2. If the confidence interval is too wide, i.e., uncertainty of the forecast is too high, the user can choose to adjust the automatic forecast value as desired. By making the forecast certainty transparent decision makers can trust the forecast when appropriate and adjust it when appropriate.

In order to simplify the interpretation of the confidence interval, the interval can be mathematically transformed to a quality metric indicating if the uncertainty of the forecast is acceptable, marginal, or unacceptable, or any plurality of quality classifications based on user defined target confidence percentages. The user selects the target confidence percentage and the model provides the associated confidence interval. The automatic mapping simplifies the decision either to proceed with the forecast in business plan 12 or to make adjustments to the forecast as necessary. One quality metric is the ratio of the confidence interval width to the forecast or $$\frac{1}{2}(U\tilde{S}_{high,d} - U\tilde{S}_{low,d})/U\tilde{S}.$$

Another quality metric is the ratio of the confidence interval width to the expected Poisson statistical uncertainty or $$\frac{1}{2}(U\tilde{S}_{high,d} - U\tilde{S}_{low,d})/\sqrt{U\tilde{S}}.$$

A third quality metric is the ratio of the model component of the confidence interval size to the forecast or $$\frac{1}{2}(U\tilde{S}_{high,d}^{mod} - U\tilde{S}_{low,d}^{mod})/U\tilde{S}.$$

Given any combination of these quality metrics, the user can define a plurality of ranges and map these ranges to qualitative indicators spanning from high confidence to low confidence. Thus, the user need not analytically interpret the graphs or tables, but rather has a customized indicator commensurate with pre-defined business plan 12.

As one example of the quality metrics, confidence indicator 88 will notify the user with a green light if the uncertainty is acceptable and red light is the uncertainty is unacceptable. A forecast of 2000 units per day with an upper bound of 3000 units per day and lower bound of 1000 units per day may be considered unacceptable (red light). A forecast of 2000 units per day with an upper bound of 2100 units per day and lower bound of 1900 units per day may be considered acceptable (green light). Confidence indicator 88 can be a binary indication, e.g. green light or red light, or a range of levels of uncertainty, e.g. high-medium-low or 1-10. The user can make the decision as to whether or not to proceed with the forecast with knowledge of the uncertainty of the forecast.

FIG. 5 is a flowchart of a method for transforming transactional data into a forecast and confidence interval to control a commerce system. In step 90, goods move between members of a commerce system. In step 92, transaction data related to movement of goods between the members of the commerce system is recorded. The transaction data includes price, product, time, and promotion. In step 94, model parameters are estimated based on the transactional data using a demand model to generate a forecast of demand for the goods based on a proposed price or promotion. In step 96, a confidence interval of the certainty associated with the forecast of demand for the goods is determined based on the proposed price or promotion. In step 98, the forecast of demand for the goods and confidence interval is provided to a member of the commerce system to control the movement of goods in the commerce system based on the forecast of demand for the goods and confidence interval. In step 100, the forecast of demand for the goods and confidence interval is graphically displayed.

FIG. 6 is a flowchart of another method for controlling commercial transactions using a forecast and confidence interval. In step 110, goods move between members of a commerce system. In step 112, transaction data related to movement of goods between the members of the commerce system is recorded. In step 114, a demand model is provided utilizing the transaction data to generate a forecast of demand for the goods based on a proposed attribute of the transaction data. In step 116, parameters for the demand model are determined. In step 118, a confidence interval for the forecast of demand is determined based on the proposed attribute of the transaction data using parameter uncertainty and statistical uncertainty. In step 120, the forecast of demand for the goods and confidence interval is provided to a member of the commerce system to control the movement of goods in the commerce system based on the forecast of demand for the goods and confidence interval. The forecast of demand for the goods and confidence interval can be graphically displayed. In step 122, a confidence percentage is selected. In step 124, a range of forecast of demand for the goods and confidence interval based on the confidence percentage is displayed as a plurality of indicators.

Figure 7:
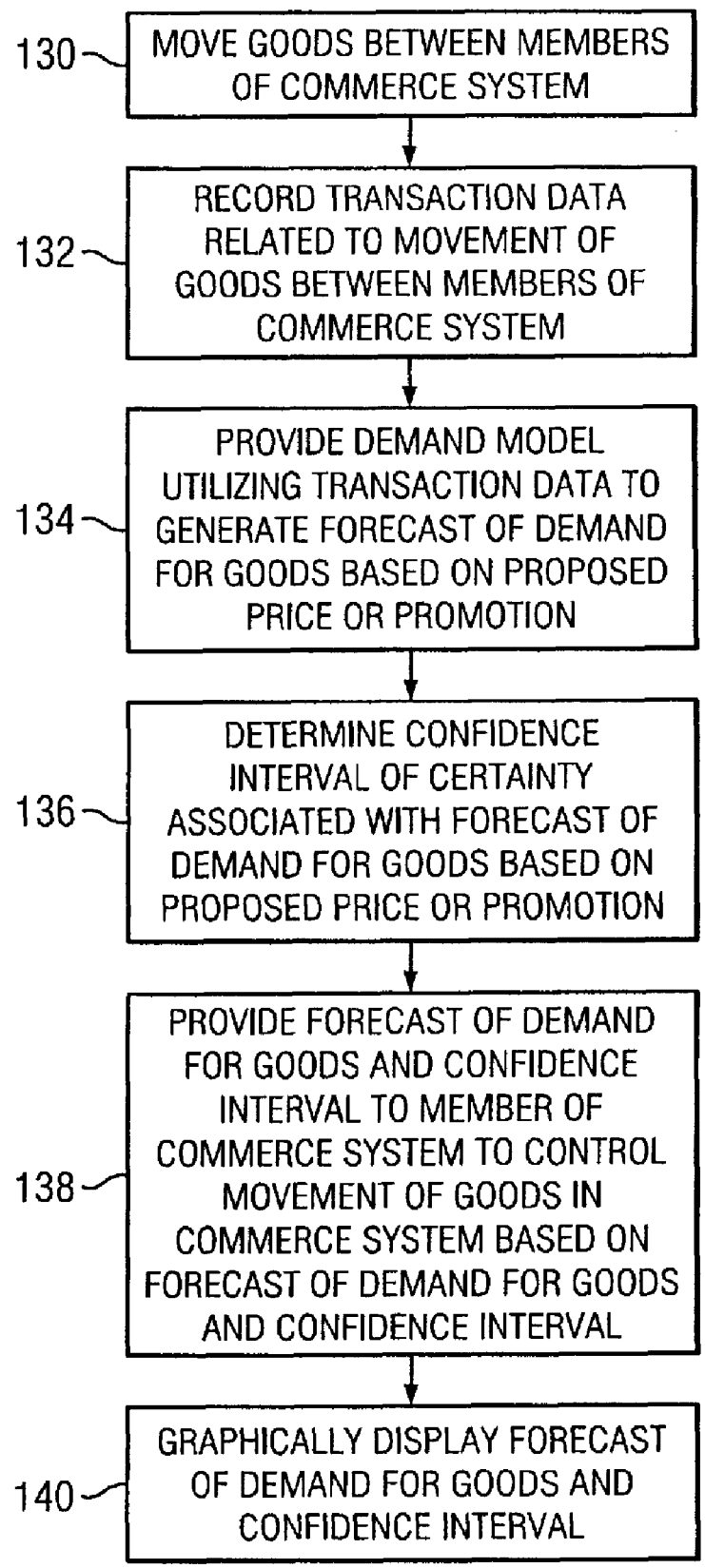
FIG. 7 is a flowchart of another method for controlling commercial transactions using a forecast and confidence interval.

FIG. 7 is a flowchart of another method for controlling commercial transactions using a demand model generated forecast and confidence interval. In step 130, goods move between members of a commerce system. In step 132, transaction data related to movement of goods between the members of the commerce system is recorded. In step 134, a demand model is provided utilizing the transaction data to generate a forecast of demand for the goods based on a proposed price or promotion. In step 136, a confidence interval of the certainty associated with the forecast of demand for the goods is determined based on the proposed price or promotion. In step 138, the forecast of demand for the goods and confidence interval is provided to a member of the commerce system to control the movement of goods in the commerce system based on the forecast of demand for the goods and confidence interval. In step 140, the forecast of demand for the goods and confidence interval is graphically displayed.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method for transforming transactional data into a forecast and confidence interval for controlling a commerce system, the method comprising:
   moving goods between members of a commerce system;
   recording transaction data related to movement of goods between the members of the commerce system, the transaction data including price, product, time, and promotion;
   estimating, by a processor, model parameters based on the transactional data using a demand model to generate a forecast of demand for the goods based on a proposed price or promotion;
   determining, by the processor, a confidence interval of the certainty associated with the forecast of demand for the goods based on the proposed price or promotion wherein the confidence interval includes an upper and lower boundary defined by $U\tilde{S}_{high,d}(t)=U\tilde{S}(t)+\sqrt{\Delta_{high,d}^2(t)+\Delta_{stat,d}^2(t)}$ and $U\tilde{S}_{low,d}(t)=U\tilde{S}(t)-\sqrt{\Delta_{low,d}^2(t)+\Delta_{stat,d}^2(t)}$, respectively, where:
   t is a time index indicating a specific time interval of an arbitrary length; d is a desired confidence interval percentage; $U\tilde{S}(t)$ is forecasted unit sales as a function of t; $\Delta_{high,d}(t)$ is a difference between $U\tilde{S}(t)$ and a upper value of the forecasted unit sales based on the demand model parameters and d; $\Delta_{low,d}(t)$ is a difference between $U\tilde{S}(t)$ and a lower value of the forecasted unit sales based on the demand model parameters and d; $\Delta_{stat,d}(t)$ is an expected statistical uncertainty in the forecast value as a function of d; $U\tilde{S}_{high,d}(t)$ is an upper boundary of the forecast confidence interval including the upper model uncertainty and statistical uncertainty as a function of d; and $U\tilde{S}_{low,d}(t)$ is the lower boundary of the forecast confidence interval including the upper model uncertainty and statistical uncertainty as a function of d; and
   providing the forecast of demand for the goods and confidence interval to a member of the commerce system to control the movement of goods in the commerce system based on the forecast of demand for the goods and confidence interval.

2. The method of claim 1, wherein the confidence interval with aggregation includes an upper and lower boundary defined by $A_{high,d}=A+\sqrt{\Delta_{high,d}^{tot^2}+\Delta_{stat,d}^{tot^2}}$, and $A_{low,d}=A-\sqrt{\Delta_{low,d}^{tot^2}+\Delta_{stat,d}^{tot^2}}$, respectively, where:
A is the sum of an arbitrary set of forecasts $U\tilde{S}(t)$; $\Delta_{high,d}^{tot}$ is a sum of $\Delta_{high,d}$ for a set of forecasts summed in A including any correlation between the set of forecasts; $\Delta_{low,d}^{tot}$ is a sum of $\Delta_{low,d}$ for the set of forecasts summed in A including any correlation between the set of forecasts; $\Delta_{stat,d}^{tot}$ is a total of $\Delta_{stat,d}$ for the set of forecasts summed in A including any correlation between the set of forecasts; $A_{high,d}$ is an upper boundary of an aggregate forecast confidence interval including an upper model uncertainty and statistical uncertainty as a function of d; and $A_{low,d}$ is a lower boundary of an aggregate forecast confidence interval including an upper model uncertainty and statistical uncertainty as a function of d.

3. The method of claim 1, wherein estimating model parameters and determining the confidence interval involves forming a covariance matrix between the model parameters.

4. The method of claim 1, further including modeling the statistical uncertainty using over-dispersion.

5. A computer-implemented method for controlling commercial transactions using a forecast and confidence interval, the method comprising:
   moving goods between members of a commerce system;
   recording transaction data related to movement of goods between the members of the commerce system;
   providing, by a processor, a demand model utilizing the transaction data to generate a forecast of demand for the goods based on a proposed attribute of the transaction data;
   determining parameters for the demand model;
   determining, by the processor, a confidence interval for the forecast of demand based on the proposed attribute of the transaction data using parameter uncertainty and statistical uncertainty, wherein the confidence interval includes an upper and lower boundary defined by $U\tilde{S}_{high,d}(t)=U\tilde{S}(t)+\sqrt{\Delta_{high,d}^2(t)+\Delta_{stat,d}^2(t)}$ and $U\tilde{S}_{low,d}(t)=U\tilde{S}(t)-\sqrt{\Delta_{low,d}^2(t)+\Delta_{stat,d}^2(t)}$, respectively, where:
   t is a time index indicating a specific time interval of an arbitrary length; d is a desired confidence interval percentage; $U\tilde{S}(t)$ is forecasted unit sales as a function of t; $\Delta_{high,d}(t)$ is a difference between $U\tilde{S}(t)$ and a upper value of the forecasted unit sales based on the demand model parameters and d; $\Delta_{low,d}(t)$ is a difference between $U\tilde{S}(t)$ and a lower value of the forecasted unit sales based on the demand model parameters and d; $\Delta_{stat,d}(t)$ is an expected statistical uncertainty in the forecast value as a function of d; $U\tilde{S}_{high,d}(t)$ is an upper boundary of the forecast confidence interval including the upper model uncertainty and statistical uncertainty as a function of d; and $U\tilde{S}_{low,d}(t)$ is the lower boundary of the forecast confidence interval including the upper model uncertainty and statistical uncertainty as a function of d; and providing the forecast of demand for the goods and confidence interval to a member of the commerce system to control the movement of goods in the commerce system based on the forecast of demand for the goods and confidence interval.

6. The method of claim 5, wherein the demand model determines the statistical uncertainty using over-dispersion.

7. The method of claim 5, further including determining the parameters and confidence interval by forming a covariance matrix between the parameters.

8. The method of claim 5, wherein the proposed attribute of the transaction data includes price or promotion.

9. The method of claim 5, further including graphically displaying the forecast of demand for the goods and confidence interval.

10. The method of claim 5, further including aggregating the parameter uncertainty and statistical uncertainty.

11. The method of claim 5, further including:
selecting a confidence percentage; and
displaying a range of forecast of demand for the goods and confidence interval based on the confidence percentage.

12. The system of claim 5, wherein the confidence interval with aggregation includes an upper and lower boundary defined by $A_{high,d} = A + \sqrt{\Delta_{high,d}^{tot^2} + \Delta_{stat,d}^{tot^2}}$, and $A_{low,d} = A - \sqrt{\Delta_{low,d}^{tot^2} + \Delta_{stat,d}^{tot^2}}$, respectively, where: A is the sum of an arbitrary set of forecasts $U\tilde{S}(t)$; $\Delta_{high,d}^{tot}$ is a sum of $\Delta_{high,d}$ for a set of forecasts summed in A including any correlation between the set of forecasts; $\Delta_{low,d}^{tot}$ is a sum of $\Delta_{low,d}$ for the set of forecasts summed in A including any correlation between the set of forecasts; $\Delta_{stat,d}^{tot}$ is a total of $\Delta_{stat,d}$ for the set of forecasts summed in A including any correlation between the set of forecasts; $A_{high,d}$ is an upper boundary of an aggregate forecast confidence interval including an upper model uncertainty and statistical uncertainty as a function of d; and $A_{low,d}$ is a lower boundary of an aggregate forecast confidence interval including an upper model uncertainty and statistical uncertainty as a function of d.

13. A computer-implemented method for controlling commercial transactions using a forecast and confidence interval, comprising:
moving goods between members of a commerce system;
recording transaction data related to movement of goods between the members of the commerce system;
providing a demand model utilizing the transaction data to generate a forecast of demand for the goods based on a proposed price or promotion;
determining, by a processor, a confidence interval of the certainty associated with the forecast of demand for the goods based on the proposed price or promotion, wherein the confidence interval includes an upper and lower boundary defined by $U\tilde{S}_{high,d}(t) = U\tilde{S}(t) + \sqrt{\Delta_{high,d}^2(t) + \Delta_{stat,d}^2(t)}$ and $U\tilde{S}_{low,d}(t) = U\tilde{S}(t) - \sqrt{\Delta_{low,d}^2(t) + \Delta_{stat,d}^2(t)}$, respectively; where:
t is a time index indicating a specific time interval of an arbitrary length; d is a desired confidence interval percentage; $U\tilde{S}(t)$ is forecasted unit sales as a function of t; $\Delta_{high,d}(t)$ is a difference between $U\tilde{S}(t)$ and a upper value of the forecasted unit sales based on the demand model parameters and d; $\Delta_{low,d}(t)$ is a difference between $U\tilde{S}(t)$ and a lower value of the forecasted unit sales based on the demand model parameters and d; $\Delta_{stat,d}(t)$ is an expected statistical uncertainty in the forecast value as a function of d; $U\tilde{S}_{high,d}(t)$ is an upper boundary of the forecast confidence interval including the upper model uncertainty and statistical uncertainty as a function of d; and $U\tilde{S}_{low,d}(t)$ is the lower boundary of the forecast confidence interval including the upper model uncertainty and statistical uncertainty as a function of d; and
providing the forecast of demand for the goods and confidence interval to a member of the commerce system to control the movement of goods in the commerce system based on the forecast of demand for the goods and confidence interval.

14. The method of claim 13, wherein the confidence interval with aggregation includes an upper and lower boundary defined by $A_{high,d} = A + \sqrt{\Delta_{high,d}^{tot^2} + \Delta_{stat,d}^{tot^2}}$, and $A_{low,d} = A - \sqrt{\Delta_{low,d}^{tot^2} + \Delta_{stat,d}^{tot^2}}$, respectively, where: A is the sum of an arbitrary set of forecasts $U\tilde{S}(t)$; $\Delta_{high,d}^{tot}$ is a sum of $\Delta_{high,d}$ for a set of forecasts summed in A including any correlation between the set of forecasts; $\Delta_{low,d}^{tot}$ is a sum of $\Delta_{low,d}$ for the set of forecasts summed in A including any correlation between the set of forecasts; $\Delta_{stat,d}^{tot}$ is a total of $\Delta_{stat,d}$ for the set of forecasts summed in A including any correlation between the set of forecasts; $\Delta_{high,d}$ is an upper boundary of an aggregate forecast confidence interval including an upper model uncertainty and statistical uncertainty as a function of d; and $A_{low,d}$ is a lower boundary of an aggregate forecast confidence interval including an upper model uncertainty and statistical uncertainty as a function of d.

15. The method of claim 13, wherein estimating model parameters and determining the confidence interval involves forming a covariance matrix between the model parameters.

16. The method of claim 13, further including graphically displaying the forecast of demand for the goods and confidence interval.

17. The method of claim 13, further including displaying an acceptable or unacceptable uncertainty in the forecast as a plurality of indicators.

18. A system for controlling commercial transactions using a forecast and confidence interval, comprising:
a commerce system having a plurality of members each having a control system for controlling movement of goods between the members;
a database in electronic communication with the commerce system for recording transaction data related to movement of goods between the members of the commerce system; and
a computer in electronic communication with the commerce system for estimating model parameters based on the transactional data using a demand model to generate a forecast of demand for the goods based on a proposed price or promotion, the computer further providing a confidence interval of the certainty associated with the forecast of demand for the goods based on the proposed price or promotion, wherein the confidence interval includes an upper and lower boundary defined by $U\tilde{S}_{high,d}(t) = U\tilde{S}(t) + \sqrt{\Delta_{high,d}^2(t) + \Delta_{stat,d}^2(t)}$ and $U\tilde{S}_{low,d}(t) = U\tilde{S}(t) - \sqrt{\Delta_{low,d}^2(t) + \Delta_{stat,d}^2(t)}$, respectively, where:
t is a time index indicating a specific time interval of an arbitrary length; d is a desired confidence interval percentage; $U\tilde{S}(t)$ is forecasted unit sales as a function of t; $\Delta_{high,d}(t)$ is a difference between $U\tilde{S}(t)$ and a upper value of the forecasted unit sales based on the demand model parameters and d; $\Delta_{low,d}(t)$ is a difference between $U\tilde{S}(t)$ and a lower value of the forecasted unit sales based on the demand model parameters and d; $\Delta_{stat,d}(t)$ is an expected statistical uncertainty in the forecast value as a function of d; $U\tilde{S}_{high,d}(t)$ is an upper boundary of the forecast confidence interval including the upper model uncertainty and statistical uncertainty as a function of d; and $U\tilde{S}_{low,d}(t)$ is the lower boundary of the forecast confidence interval including the upper model uncertainty and statistical uncertainty as a function of d; and wherein the forecast of demand for the goods and confidence interval is provided to a member of the commerce system to control the movement of goods in the commerce system based on the forecast of demand for the goods and confidence interval.

19. The system of claim 18, wherein the model parameters and confidence interval are derived from a covariance matrix between the model parameters.

20. The system of claim 18, wherein an acceptable or unacceptable uncertainty in the forecast is displayed as a plurality of indicators.

21. The system of claim 18, wherein the confidence interval with aggregation includes an upper and lower boundary defined by $A_{high,d} = A + \sqrt{\Delta_{high}^{tot^2} + \Delta_{stat,d}^{tot^2}}$, and $A_{low,d} = A - \sqrt{\Delta_{low,d}^{tot^2} + \Delta_{stat,d}^{tot^2}}$, respectively, where: A is the sum of an arbitrary set of forecasts $U\tilde{S}(t)$; $\Delta_{high,d}^{tot}$ is a sum of $\Delta_{high,d}$ for a set of forecasts summed in A including any correlation between the set of forecasts; $\Delta_{low,d}^{tot}$ is a sum of $\Delta_{low,d}$ for the set of forecasts summed in A including any correlation between the set of forecasts; $\Delta_{stat,d}^{tot}$ is a total of $\Delta_{stat,d}$ for the set of forecasts summed in A including any correlation between the set of forecasts; $A_{high,d}$ is an upper boundary of an aggregate forecast confidence interval including an upper model uncertainty and statistical uncertainty as a function of d; and $A_{low,d}$ is a lower boundary of an aggregate forecast confidence interval including an upper model uncertainty and statistical uncertainty as a function of d.

* * * * *